Feb. 2, 1932.  H. T. SEELEY  1,843,788
CONTROL SYSTEM
Filed July 24, 1929

Inventor:
Harold T. Seeley,
by Charles E. Tullar
His Attorney.

Patented Feb. 2, 1932

1,843,788

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

CONTROL SYSTEM

Application filed July 24, 1929. Serial No. 380,699.

My invention relates to control systems and particularly to systems for controlling the frequency of an alternating current circuit, and one object of my invention is to provide an improved arrangement for controlling the frequency of an alternating current circuit so as to make it equal to the frequency of another alternating current circuit.

In order to prevent the connection of two alternating current circuits, such as a generator to an alternating current system, from producing large voltage disturbance thereon, it is necessary that the frequencies of the two circuits be substantially equal at the time they are connected together. In accordance with my invention, I provide an improved arrangement for controlling the frequency of one of the circuits which includes two electroresponsive devices selectively energized in response to the relative phase rotation of two phase displaced voltages obtained from one of the circuits with respect to a voltage obtained from the other circuit.

My invention will be better understood from the following description, taken in connection with the accompanying drawings and its scope will be pointed out in the appended claims.

Figure 1:
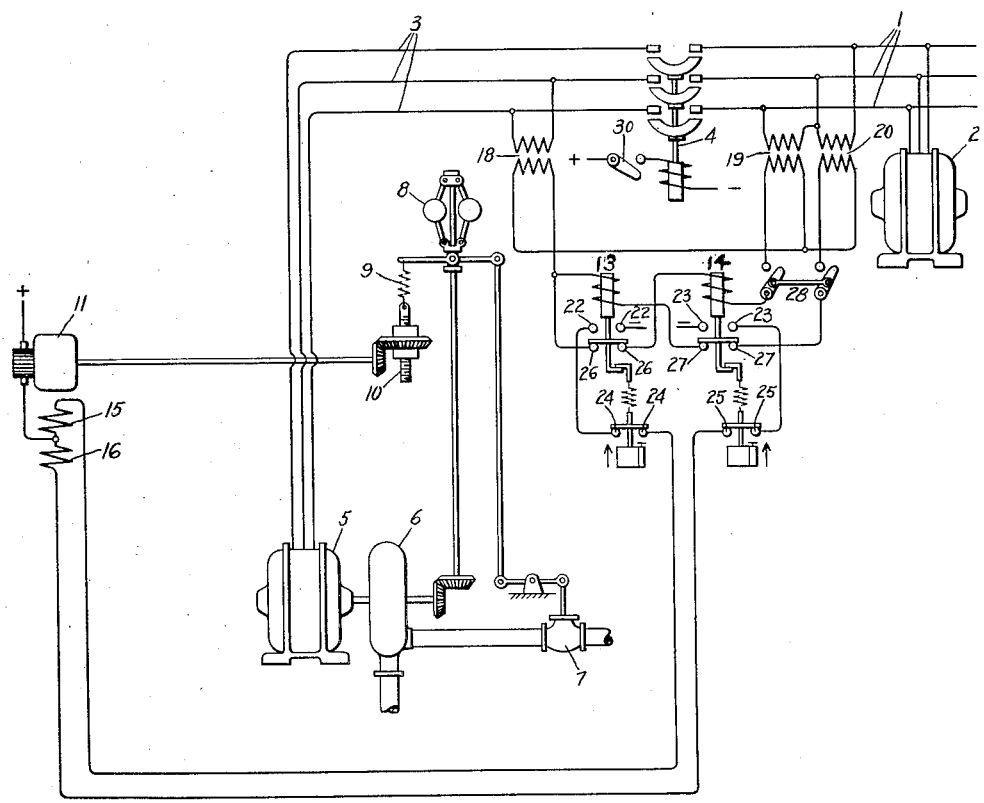
Figure 2:
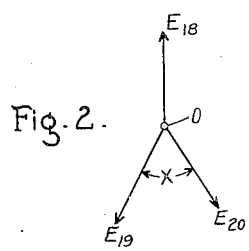

In the accompanying drawings, Fig. 1 shows diagrammatically a frequency control system embodying my invention and Fig. 2 is a vector diagram, shown for the purpose of explaining the operation of my invention.

Referring to Fig. 1 of the accompanying drawings, 1 represents a polyphase circuit, which may be a part of an alternating current system of distribution supplied by a suitable source 2. 3 represents another polyphase circuit which is arranged to be connected to the polyphase circuit 1 by means of a circuit breaker 4 which may be of any suitable type, examples of which are well known to the art. As shown, the circuit 3 is supplied from a dynamo electric plant comprising a polyphase alternator 5 driven by a suitable prime mover 6, supplied with operating fluid through a valve or gate 7 which is maintained in a position dependent upon the speed of the prime mover by suitable speed governing means examples of which are well known in the art. As shown in the drawings the speed governing means includes a fly ball governor 8 which operates against the tension of a spring 9. In order to vary the speed of the prime mover which the governor maintains, suitable means are provided for varying the tension of the spring 9. As shown, this means comprises a screw mechanism 10 which is operated by a reversible motor 11.

In accordance with the embodiment of my invention shown in the drawings, I provide an improved arrangement for controlling the reversible motor 11, when it is desired to connect the circuit 3 to the circuit 1, so that the frequencies of the two circuits are equalized. As shown, this arrangement includes two electroresponsive devices 13 and 14, shown as relays, which respectively control the circuits of the field windings 15 and 16 of the reversible motor 11 so as to effect the operation of the motor in opposite directions. The relay 13 is connected to the circuits 1 and 3 so that it is energized in response to a resultant of certain voltages of said circuits and the relay 14 is connected to the circuits 1 and 3 so that it is energized in response to a resultant of certain other voltages of said circuits. As shown in the drawings, the relay 14 is connected by the potential transformers 18 and 19 so that it is energized in response to the resultant of one phase voltage of the circuit 3 and the corresponding phase voltage of the circuit 1 and the relay 13 is connected by the potential transformers 18 and 20 so that it is energized in response to the resultant of said phase voltage of the circuit 3 and the voltage of a different phase of the circuit 1. The secondary windings of the transformers 19 and 20 are so connected in the drawings that the secondary voltages of the transformers 19 and 20 are 60 degrees out of phase with each other. The transformers 18, 19 and 20, however, may be connected in any other well known manner so that two voltages having a predetermined phase displacement with respect to each other are obtained from one of the circuits and a voltage is obtained from the other circuit.

The operation of the relays 13 and 14 will be better understood by referring to the vector diagram shown in Fig. 2 in which the vector $E_{18}$ represents the secondary voltage of the transformer 18 and the vector $E_{19}$ and $E_{20}$ represent respectively the secondary voltages of the transformers 19 and 20 and the angle represents the phase displacement between the secondary voltages of the transformers 19 and 20. When the frequency of the circuit 3 is below the frequency of the circuit 1, the vector $E_{18}$ rotates in one direction about the origin O relatively to the vectors $E_{19}$ and $E_{20}$ at a rate of one revolution per cycle of frequency difference. Similarly, when the frequency of the circuit 3 is above the frequency of the circuit 1, the vector $E_{18}$ rotates in the opposite direction about the origin O relatively to the vectors $E_{19}$ and $E_{20}$ at a rate of one revolution per cycle of frequency difference. It will be observed from the diagram that when the vector $E_{18}$ rotates in one direction with respect to the vectors $E_{19}$ and $E_{20}$, the sum of the voltages $E_{18}$ and $E_{19}$ reaches its maximum value before the sum of the voltages $E_{18}$ and $E_{20}$ reaches its maximum value whereas when the vector $E_{18}$ rotates in the opposite direction the reverse is true. Since the relay 13 is connected so that it is energized in response to the vectorial sum of the voltages $E_{18}$ and $E_{20}$ and the relay 14 is connected so that it is energized in response to the vectorial sum of the voltages $E_{18}$ and $E_{19}$, it will be seen that when the frequency of the circuit 3 is below the frequency of the circuit 1, one of the relays will pick up before the other, whereas when the frequency of the circuit 3 is above the frequency of the circuit 1, the other relay will pick up first. It is this feature of selectively operating the relays 13 and 14 in response to the relative phase rotation of the vector $E_{18}$ with respect to the voltages $E_{19}$ and $E_{20}$ that I employ selectively to control the direction of rotation of the motor 11.

If we assume, for example, that the phase rotation of the two circuits 1 and 3 is such that the vector $E_{18}$ rotates clockwise with respect to the vectors $E_{19}$ and $E_{20}$ when the frequency of the circuit 3 is below the frequency of the circuit 1 and rotates counter-clockwise with respect to the vectors $E_{19}$ and $E_{20}$ when the frequency of the circuit 3 is above the frequency of the circuit 1, it will be seen that relay 13 will pick up first and close its contacts 22 when the frequency of the circuits 3 is below the frequency of the circuit 1, and the relay 14 will pick up first and close its contacts 23 when the frequency of the circuit 3 is above the frequency of the circuit 1. Relay 13, by closing its contacts 22, completes an energizing circuit for the field winding 15 and the armature winding of the motor 11 so that the motor operates in the proper direction to adjust the spring 9 so that the speed of the generator 5 is increased.

In order that the rate at which the generator speed is changed may vary directly with the frequency difference between the generator frequency and the frequency of the circuit 1, I provide suitable means associated with the relay 13 whereby the circuit of the motor 11, which the closing of the contacts 22 completes, remains completed for only a predetermined length of time after the relay 13 picks up. As shown in the drawings, this result is obtained by also providing the relay 13 with the time delayed contacts 24 in series with the contacts 22, and arranging the contacts 24 in any suitable manner, examples of which are well known in the art, so that they are opened after the relay 13 has been picked up a predetermined length of time. The motor 11, therefore, receives a series of impulses when the frequency of the generator 5 is below the frequency of circuit 1 and number of impulses per second decreases directly with the frequency difference, which is a desirable feature of my invention since it prevents the governor from overshooting.

The relay 14 by closing its contacts 23, completes an energizing circuit for the field winding 16 and the armature winding of the motor 11 so that the motor operates in a direction to adjust the spring 9 in such a manner that the speed of the generator 5 is decreased. The relay 14 is also provided with the time delayed opening contacts 25 which are connected in series with the contacts 23 so that the rate, at which the speed of the generator 5 is decreased, varies directly with the difference between frequency of the circuits 1 and 3.

It will be observed from Fig. 2 that each time the vector $E_{18}$ makes one complete revolution with respect to the vectors $E_{19}$ and $E_{20}$ each of the vectorial voltages $E_{18}+E_{19}$ and $E_{18}+E_{20}$ reaches its maximum value once and, therefore, both of the relays 13 and 14 if they remained in circuit all the time would be picked up once during each revolution and during part of the time both relays would be trying simultaneously to effect the operation of the motor 11 in opposite directions. In order to prevent such operation of the relays, they are so connected that the first relay to pick up renders the other inoperative as long as the first relay remains picked up. Also each relay is so designed that it drops out at a time when the vectorial sum of the voltages impressed across the other relay is below its pick up value so that only one relay is picked up during each complete cycle of frequency difference. As shown in the drawings, the relay 13 is provided with the normally closed contacts 26 which are in the circuit of the winding of relay 14 and the relay 14 is provided with the normally closed contacts 27 which are in the circuit of the winding of relay 13. Therefore, whenever either relay picks up, the other relay is rendered inoperative until the picked up relay drops out.

28 represents a control switch for controlling the energization of the relays 13 and 14 whereby the control system may be rendered inoperative.

Any suitable means, which may be controlled either manually or automatically, may be provided for effecting the closing of the circuit breaker 4. While my invention is particularly adapted for use in automatic stations in which an automatic synchronizer is employed to effect the closing of the circuit breaker 4, in the present embodiment of my invention, in order to simplify the disclosure, I have shown the circuit breaker 4 with a closing coil 29, the energizing circuit of which is controlled by a manually operated control switch 30.

The operation of the control system shown in Fig. 1 is as follows: With the control switch 28 closed and the frequency of the circuit 1 below the frequency of the circuit 3, once during each cycle of the frequency difference the relay 13 picks up and completes the circuit of the field winding 15 and the armature winding of the motor 11 for a predetermined time and maintains the relay 14 deenergized so that the motor 11 is operated for a predetermined time to adjust the governor speed in such a manner as to increase the speed and frequency of the generator 5. When the frequency of the circuit 1 is above the frequency of the circuit 3, the relay 14 picks up once during each cycle of the frequency difference and completes the circuit of the field winding 16 and the armature winding of the motor 11 for a predetermined time and maintains the relay 14 deenergized so that the motor is operated for a predetermined time to adjust the governor speed in such a manner as to decrease the speed and frequency of the generator 5.

When the speed difference has been decreased to substantially zero and the two circuits are substantially in synchronism, the switch 30 may then be closed to effect the closing of the circuit breaker 4 without producing large voltage disturbances on the circuits.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, two alternating current circuits, and means for controlling the frequency of one of said circuits including a plurality of devices respectively energized in response to predetermined functions of different voltages obtained from said circuits whereby the sequence of operation of said devices depends upon the relative frequencies of the voltages of said circuits, and means controlled by each device for rendering the other device inoperative.

2. In combination, two alternating current circuits, and means for controlling the frequency of one of said circuits including two electroresponsive devices respectively responsive to a function of a voltage of one of said circuits and a voltage of the other of said circuits and a function of said voltage of one of said circuits and another voltage of said circuits, and means controlled by each device for rendering the other device inoperative.

3. In combination, two polyphase circuits, and means for controlling the frequency of one of said circuits including two electroresponsive devices respectively responsive to a function of a voltage of one of said circuits and a voltage of the other of said circuits and a function of said voltage of one of said circuits and another voltage of said other circuit, and means controlled by each device for rendering the other inoperative.

4. In combination, two polyphase circuits, and means for controlling the frequency of one of said circuits including an electroresponsive device having a winding connected to said circuits so as to be energized in response to the resultant of a voltage of one of said circuits and a voltage of the other of said circuits, and another electroresponsive device having a winding connected to said circuits so as to be energized in response to the resultant of a voltage of said one of said circuits and a voltage of said other of said circuits, and means controlled by each device for rendering the other device inoperative.

5. In combination, two polyphase circuits, and means for controlling the frequency of one of said circuits including an electroresponsive device having a winding connected to said circuits so as to be energized in response to the resultant of a voltage of one of said circuits and a voltage of the other of said circuits, another electroresponsive device having a winding connected to said circuits so as to be energized in response to the resultant of said voltage of one of said circuits and another voltage of said other of said circuits, and means controlled by each device for rendering the other device inoperative.

6. In combination, two polyphase circuits, and means for controlling the frequency of one of said circuits including an electroresponsive device having a winding connected to said circuits so as to be energized in response to the resultant of a voltage of one of said circuits and a voltage of the other of said circuits, another electroresponsive device having a winding connected to said circuits so as to be energized in response to the resultant of said voltage of one of said circuits and another voltage of said other of said circuits, and contacts in the circuit of the winding of each of said devices controlled by the other of said devices.

7. In combination, two polyphase circuits, and means for controlling the frequency of one of said circuits including an electroresponsive device having a winding connected to said circuits so as to be energized in response to the resultant of a voltage of one of said circuits and a voltage of the other of said circuits, another electroresponsive device having a winding connected to said circuits so as to be energized in response to the resultant of said voltage of one of said circuits and another voltage of said other of said circuits, and contacts in the circuit of each winding respectively controlled by the other device.

8. In combination, two alternating current circuits, an electroresponsive device connected to said circuits so that it is energized in response to a function of a voltage of one of said circuits and a voltage of the other of said circuits, a control circuit, and means controlled by said electroresponsive device for completing said control circuit for a predetermined length of time, another electroresponsive device connected to said circuits so that it is energized in response to a function of said voltage of said one of said circuits and another voltage of said other of said circuits, a second control circuit, means controlled by said last mentioned electroresponsive device for completing said last mentioned control circuit for a predetermined length of time, and means controlled by said devices for preventing both of said control circuits from being simultaneously completed.

9. In combination, two polyphase circuits, an electroresponsive device connected to said circuits so that it is energized in response to the resultant of a voltage of one of said circuits and a voltage of the other of said circuits, a control circuit, and means controlled by said electroresponsive device for completing said control circuit for a predetermined length of time in response to a predetermined resultant of said voltages, another electroresponsive device connected to said circuits so that it is energized in response to the resultant of said voltage of said one of said circuits and another voltage of said other of said circuits, a second control circuit, means controlled by said last mentioned electroresponsive device for completing said last mentioned control circuit for a predetermined length of time in response to a predetermined resultant of said last mentioned voltages, and contacts in the circuit of each electroresponsive device respectively controlled by the other electroresponsive device so that the operation of either of said devices to complete the control circuit control thereby renders the other device inoperative to complete the control circuit controlled thereby.

10. In combination, two alternating current circuits, means for changing the frequency of one of said circuits, means including an electroresponsive device responsive to a predetermined resultant of a voltage of one of said circuits and a voltage of the other of said circuits for effecting the operation of said frequency changing means to increase the frequency controlled thereby for a predetermined length of time only whenever said predetermined resultant occurs, means including an electroresponsive device responsive to a predetermined resultant of said voltage of one of said circuits and another voltage of the other of said circuits for effecting the operation of said frequency changing means to decrease the frequency controlled thereby for a predetermined length of time only whenever said last mentioned predetermined resultant occurs, and means controlled by said devices for controlling the energization of each other whereby the operation of said frequency changing means can be effected by only one of said devices at any given instant.

In witness whereof, I have hereunto set my hand this 20th day of July, 1929.

HAROLD T. SEELEY.

DISCLAIMER 1,843,788.—*Harold T. Seeley*, Yeadon, Pa. CONTROL SYSTEM. Patent dated February 2, 1932. Disclaimer filed November 9, 1934, by the assignee, *General Electric Company*.

Hereby enters this disclaimer to that part of the claim in said specification which is in the following words, to wit:

"8. In combination, two alternating current circuits, an electroresponsive device connected to said circuits so that it is energized in response to a function of a voltage of one of said circuits and a voltage of the other of said circuits, a control circuit, and means controlled by said electroresponsive device for completing said control circuit for a predetermined length of time, another electroresponsive device connected to said circuits so that it is energized in response to a function of said voltage of said one of said circuits and another voltage of said other of said circuits, a second control circuit, means controlled by said last mentioned electroresponsive device for completing said last mentioned control circuit for a predetermined length of time, and means controlled by said devices for preventing both of said control circuits from being simultaneously completed."

[*Official Gazette December 4, 1934.*]